Patented Oct. 14, 1930

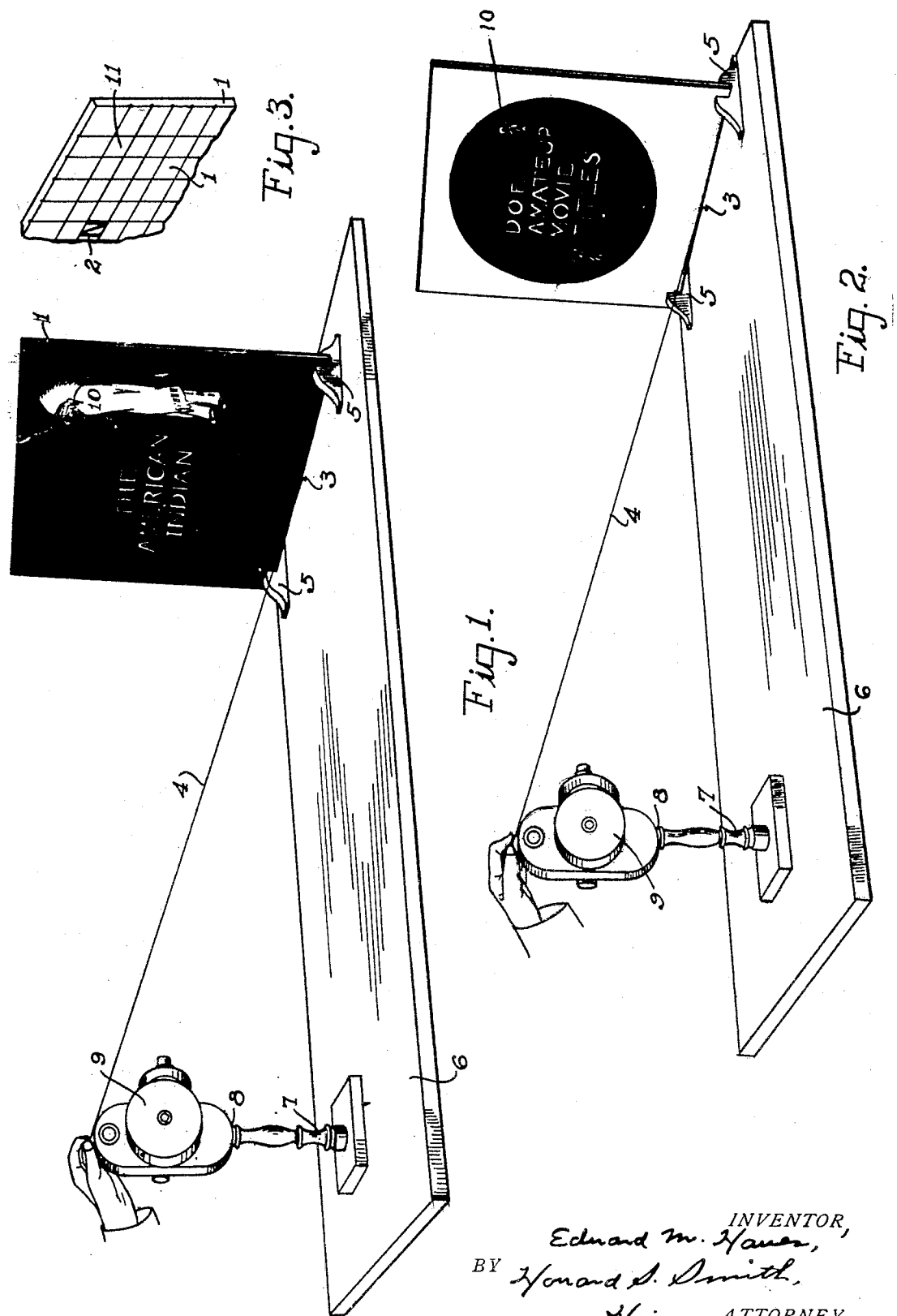

1,778,495

UNITED STATES PATENT OFFICE

EDWARD MASON HAWES, OF MARIETTA, OHIO

METHOD OF AND MEANS FOR TITLING MOVING-PICTURE FILMS

Application filed September 10, 1928. Serial No. 304,941.

This invention relates to a new and useful method of, and means for, titling moving picture films.

It is one of the principal objects of my invention to provide a method and device by which titles and subtitles may be incorporated in moving picture films. Both are particularly adapted for use with amateur motion picture cameras employing a 16 mm. film, although they may be used with the so-called professional or 35 mm. film.

The chief purpose of the invention is to permit anyone without a knowledge of, or skill in, hand lettering to make effective titles in a wide variety of arrangements. Its further purpose is to make possible the use of the making of titles in any ordinary home without any other equipment than the camera and the outfit provided by the titler itself.

In the accompanying drawings illustrating an assembly by which my invention is carried out, Figure 1 is a perspective view of the camera and associated means set up for use in making a title displayed on the side of the creased background finished in black. Figure 2 is a similar perspective view showing the reverse side of the background exposed to the camera. And Figure 3 is a detail view of a portion of the creased background.

My method of titling moving picture films may best be described in connection with the means illustrated for carrying it into effect. These means may be varied without departing from the spirit of the invention.

Referring to the drawings, the numeral 1 designates a creased background for the setting of the letters 2. It is made of porous fibre and is creased in quarter inch squares to facilitate the easy setting of the letters. The side of the background exposed to the camera in Figure 1 is finished in black, and its other side, shown in Figure 2, is finished in two contrasting colors, one color forming an oval or other bordered design.

Secured to the bottom of the board 1 by a tack 3 which is centered on its bottom margin, and extending out four feet, is a focusing cord 4, its purpose being distinctive to the set or to the making of moving picture titles with the amateur camera.

The background 1 is supported by two feet 5, 5 which rest upon a table top 6 or other flat surface. These feet are so constructed as to hold the background in a vertical position.

At the rear end of the table top 6 is a pedestal 7 to the top of which there is secured a tripod socket 8 for supporting a camera 9. This supporting structure is constructed to the proper height for the particular camera so that the center of the lens will center on the title board 1.

The finding device on the amateur camera is not centered with the lens and on working at short distances does not center the object on the film. It is highly necessary that this be done in the case of titles. Therefore, I provide the focusing cord 4 which is attached to the bottom center of the background 1, and on being stretched taut over the center of the lens and being lined up parallel with the side of the camera in this stretched position as shown in Figures 1 and 2, does center the image on this background. It is also set so that the focus is right without having to measure the distance.

The simple but unique device just described overcomes the inherent defect of the camera on short focal distances.

Assorted pressed wood ornaments 10 with points affixed to the back to permit their being placed on the background 1 in the same manner as the letters 2, may be used for the purpose of ornaments. They may be of different design and are not necessarily always alike.

The letters 2 are preferably of the type covered by my United States Patent No. 1,592,208, and are mounted on the background in the manner therein described. Other types of letters or characters are also within the scope of the invention.

In order that the letters 2 may be applied to the background 1 in proper arrangement, it is creased to form quarter inch squares as shown in Figure 3. Within these squares the letters may be easily set by the veriest amateur.

The first step in my method of making a title or sub-title for a moving picture film is to "layout" the copy; that is, to write it in rough form and count the letters in each line, noting the number, including one letter for each space between words at the right hand of the line. The copy should be rearranged, if necessary, to get about the same number of letters in each line of the body of the caption.

Other characters such as figures should next be put on the "layout" on the left of the lines showing up and down spacing.

The title is then set up by laying the background flat on the table and removing the letters 2 with a magnet from a compartment of a box (not shown). These letters are then applied to the background on the creased line that has been measured to.

When a line is set, a ruler or yardstick should be placed on top of the letters and pressed along it with the ball of the hand to make the line look uniform and even. The next line is set by moving the ruler down the required distance. This is repeated until the title is complete.

The pressed fibre ornaments 10 are then applied to the background if desired.

Illustrations, preferably those in black and white, cut from printed matter, may be posted on any scrap of thin cardboard and mounted on the background in a proper location.

Double exposure effects, which are merely an extension of the illustration idea, may be obtained by having the picture cover all or a part of the background under the letters. In this case the picture need not be mounted on cardboard or even thumb tacks affixed.

The title may also be illustrated by a drawing, comic or serious. The title should be set, allowing space for the drawing; and then if one wishes to take pictures showing the drawing being made, the background 1 should be supported against a wall during the execution of the drawing.

By merely letting the edge of the background project over the edge of the table so that a child can stand in front of it, interest may be added to the amateur title by including the child in the picture.

A picture of the title set up on the background 1 is taken by first applying the feet 5 to its bottom edge, with the board well down in the slots and then placing it in a vertical position on one end of the table as shown in Figure 1, preferably before a window with light from the north. The raised effect of the letters will be accentuated if the background is placed so that the light falls diagonally across it.

The camera should be screwed on the tripod and placed about four feet toward the window from the background. Any table four feet long—or even a floor—will serve to support the background and camera, being sure that the latter and the background are about level with each other.

The title is automatically centered "up and down" when the background has been placed in the grooved feet and the camera on the tripod.

The focusing cord 4 is always attached to the bottom of the board 1, whose bottom margin appears much wider than the top margin. This is to allow space on the board to fit into the grooved feet without the same appearing in the photograph.

For "sidewise" focusing, the cord 4 is stretched at right angles in front of the background and over the top of the camera and center of the lens. By sighting along the cord the camera may be lined straight with it, being sure to keep the center of the lens under the line. This will center the title sidewise.

When the cord reaches the approximate center of the camera, it is at a proper distance for the right focus.

The cord should now be released and the stop set. No portrait stop is necessary. Stop four or eight for inside photographs and stop eleven for outside photographs in bright sunlight will work well.

The picture is then taken and exposed as long as it takes to read the actual title.

In taking down the title, the board 1 is first removed from the feet 5 and placed flat on the table. By the insertion of a knife or other instrument under the top of each character, and with a slight upward movement of the instrument, they will loosen easily for removal and replacement in the compartment of the box which receives them. The board should then be cleaned and touched up with a color if marred or scratched.

Having described my invention, I claim:

1. The herein described method of titling moving picture films, which consists first in laying out characters constituting the title on a background, then supporting the latter in a vertical position on a plane surface in front of a camera on the same surface, then focusing the camera sidewise with a cord at right angles to the front of the background and stretched taut over the top of the camera and the center of its lens, and then taking a picture of the title on the background.

2. Means for titling a moving picture film comprising a camera supported in a vertical position on a plane surface, a background supported in a vertical position on the same surface in front of the camera, characters applied to said background to form a title thereon, and a focusing cord connected to the bottom margin of the background and stretched taut over the top of the camera and the center of its lens for the purpose specified.

3. Means for titling a moving picture film, comprising a flat surface, a camera supported in a vertical position on said surface, a title board supported in a vertical position on the same surface in front of the camera, characters applied to said board to form a title thereon, and a focusing cord connected to the bottom margin of the title board and stretched taut over the top of the camera and center of its lens for the purpose specified.

4. Means for titling a moving picture film, comprising a flat member, a camera, a tripod for supporting said camera in a vertical position on said member, a title board, grooved feet applied to the latter, for supporting it in a vertical position upon said member in front of the camera, characters applied to said board to form a title thereon, and a focusing cord connected to the bottom margin of the title board and stretched taut over the camera and center of its lens for the purpose specified.

In witness whereof I have hereunto set my hand this 8th day of September, 1928.

EDWARD MASON HAWES.